(12) United States Patent
Shiraishi et al.

(10) Patent No.: US 11,875,757 B2
(45) Date of Patent: Jan. 16, 2024

(54) INFORMATION PROCESSING SYSTEM

(71) Applicant: NEC CORPORATION, Tokyo (JP)

(72) Inventors: Soma Shiraishi, Tokyo (JP); Kota Iwamoto, Tokyo (JP); Hideo Yokoi, Tokyo (JP); Tsugunori Takata, Tokyo (JP); Emi Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 580 days.

(21) Appl. No.: 16/977,316

(22) PCT Filed: Mar. 2, 2018

(86) PCT No.: PCT/JP2018/008078
§ 371 (c)(1),
(2) Date: Sep. 1, 2020

(87) PCT Pub. No.: WO2019/167267
PCT Pub. Date: Sep. 6, 2019

(65) Prior Publication Data
US 2021/0058586 A1 Feb. 25, 2021

(51) Int. Cl.
*G09G 3/36* (2006.01)
*G02B 27/28* (2006.01)
(Continued)

(52) U.S. Cl.
CPC .............. *G09G 3/36* (2013.01); *G02B 27/281* (2013.01); *G06F 3/14* (2013.01); *G06T 7/00* (2013.01);
(Continued)

(58) Field of Classification Search
CPC .... G06F 3/03545; G06F 3/0425; G06F 3/033; G06F 3/038; G05B 2219/40099;
(Continued)

(56) References Cited

U.S. PATENT DOCUMENTS 9,978,050 B2 * 5/2018 Matsuzaki ........... G06Q 20/208
2010/0060732 A1 * 3/2010 Tsuji ................... G06V 10/145
348/222.1

(Continued)

FOREIGN PATENT DOCUMENTS

JP 08-272934 A 10/1996
JP 08272934 A * 10/1996
(Continued)

OTHER PUBLICATIONS

Japanese Office Action for JP Application No. 2020-503240 dated Sep. 21, 2021 with English Translation.
(Continued)

*Primary Examiner* — Masum Billah
(74) *Attorney, Agent, or Firm* — Sughrue Mion, PLLC

(57) ABSTRACT

An information processing system (2000) includes a camera (10), a polarization filter (20), a display device (30), and an information processing apparatus (200). The display device (30) includes a display screen (32), and an object (40) is placed on the display screen (32). The camera (10) has an image area in which the display screen (32) is included. The information processing apparatus (200) displays, on the display screen (32), a first display based on a captured image (12) generated by the camera (10). The polarization filter (20) is located between a lens of the camera (10) and the display screen (32) when the lens of the camera (10) faces the display screen (32).

5 Claims, 11 Drawing Sheets

(51) Int. Cl.
  *G06F 3/14*    (2006.01)
  *H04N 7/18*    (2006.01)
  *G06T 7/00*    (2017.01)
  *H04N 23/55*   (2023.01)
  *G06V 10/147*  (2022.01)

(52) U.S. Cl.
  CPC .............. *G06V 10/147* (2022.01); *H04N 7/18* (2013.01); *H04N 23/55* (2023.01)

(58) Field of Classification Search
  CPC ........... G05B 2219/40123; G05B 2219/40409; G05B 2219/40411; G05B 15/02; B25J 13/06; B25J 13/08; B25J 13/084; B25J 5/007
  USPC ........................................................ 382/260
  See application file for complete search history.

(56) References Cited

U.S. PATENT DOCUMENTS

| | | | |
|---|---|---|---|
| 2014/0157156 A1* | 6/2014 | Kawamoto | G06F 3/04842 715/764 |
| 2014/0200714 A1* | 7/2014 | Kawamoto | B25J 13/06 901/1 |
| 2016/0086149 A1 | 3/2016 | Yuyama | |
| 2016/0364714 A1* | 12/2016 | Hodges | G06Q 30/0623 |
| 2017/0031530 A1* | 2/2017 | Ikeda | G06F 3/04883 |

FOREIGN PATENT DOCUMENTS

| | | |
|---|---|---|
| JP | 2005-117285 A | 4/2005 |
| JP | 2007-018426 A | 1/2007 |
| JP | 2016-062545 A | 4/2016 |

OTHER PUBLICATIONS

International Search Report for PCT/JP2018/008078 dated May 22, 2018 [PCT/ISA/210].
Written Opinion for PCT/JP2018/008078 dated May 22, 2018 [PCT/ISA/237].

* cited by examiner

FIG. 7
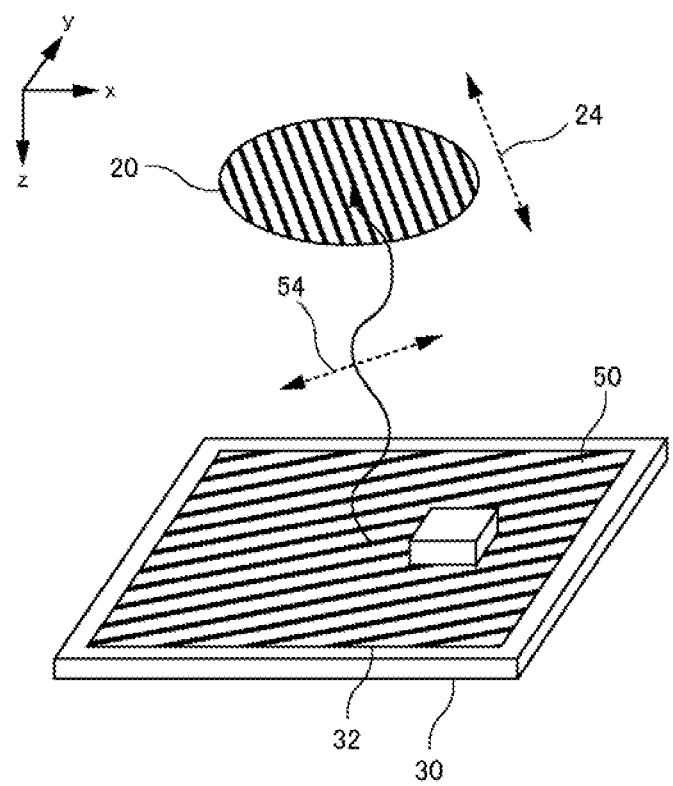
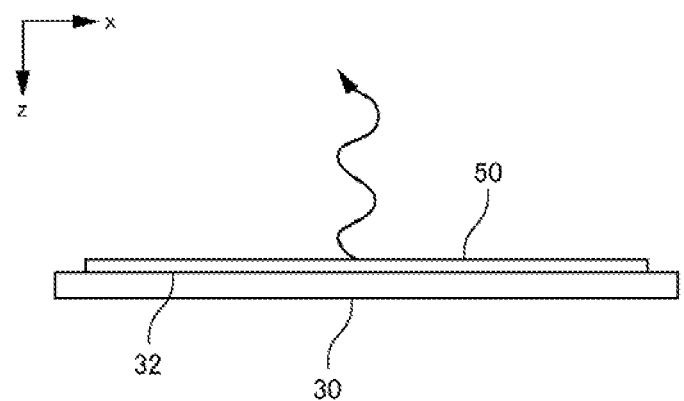

FIG. 11
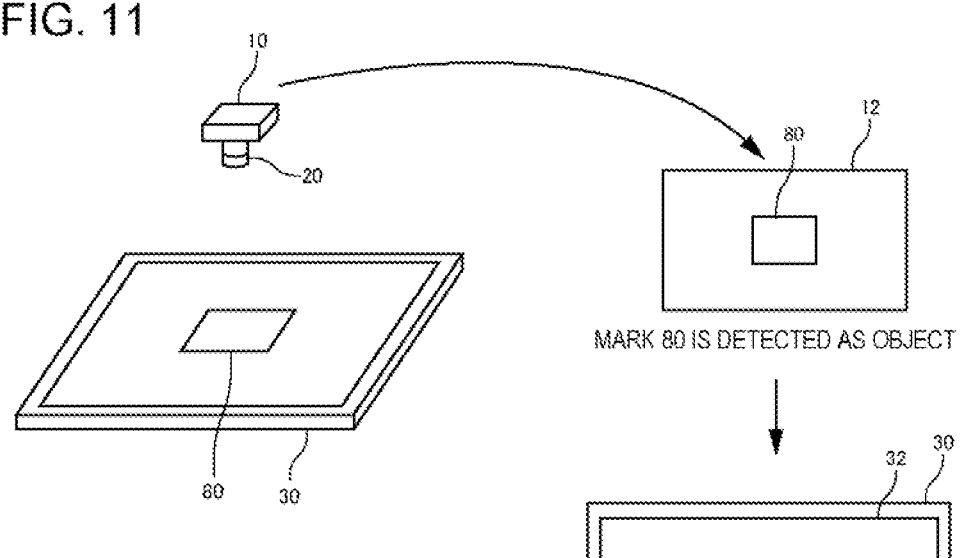
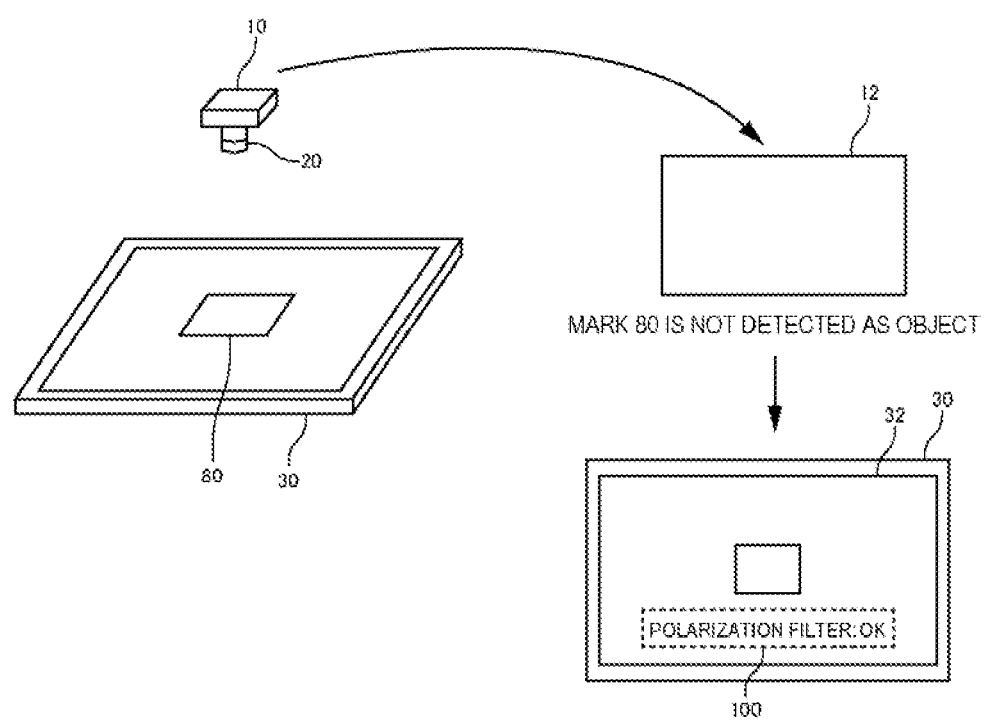

INFORMATION PROCESSING SYSTEM

CROSS REFERENCE TO RELATED APPLICATIONS

This application is a National Stage of International Application No. PCT/JP2018/008078 filed Mar. 2, 2018.

TECHNICAL FIELD

The present invention relates to an information processing system.

BACKGROUND ART

A technique of recognizing a product by capturing an image of the product by a camera has been developed. Patent Document 1 discloses a product registration apparatus that captures an image of a product to be checked out, recognizes the product in the image by image analysis, and registers the product.

RELATED DOCUMENT

Patent Document

[Patent Document 1] Japanese Laid-open Patent Publication No. 2016-62545

SUMMARY OF THE INVENTION

Technical Problem

The present inventor has found out a system that recognizes a product placed on a display device including a display screen facing upward through image analysis on a captured image obtained by capturing an image of the product. Further, the present inventor has examined displaying a display based on image analysis on the display device in such a system. As a result of the examination, the present inventor has found that the display on the display device may affect subsequent image analysis.

The present invention has been made in view of the above problem. An object of the present invention is to provide a technique of improving accuracy of image analysis in a system that recognizes a product placed on a display screen by image analysis.

Solution to Problem

According to the present invention, there is provided an information processing system including: 1) a display device having a display screen on which an object is placed; 2) a camera having an image area in which the display screen is included; 3) an information processing apparatus that displays, on the display screen, a first display based on a captured image generated by the camera; and 4) a first polarization filter.

The first polarization filter is located between a lens of the camera and the display screen when the lens of the camera faces the display screen.

Advantageous Effects of Invention

According to the present invention, there is provided a technique of improving accuracy of image analysis in a system that recognizes a product placed on a display screen by image analysis.

BRIEF DESCRIPTION OF THE DRAWINGS

The above-described object and other objects, features, and advantages will be further clarified by the preferred example embodiment to be described below and the accompanying drawings attached herein.

FIG. 7 is a diagram illustrating a situation in which a second polarization filter is provided on the display device.

FIG. 11 is a diagram illustrating a scene in which a result of determination as to whether or not a direction of the first polarization filter is proper is displayed on the display screen.

DESCRIPTION OF EMBODIMENTS

Figure 1:
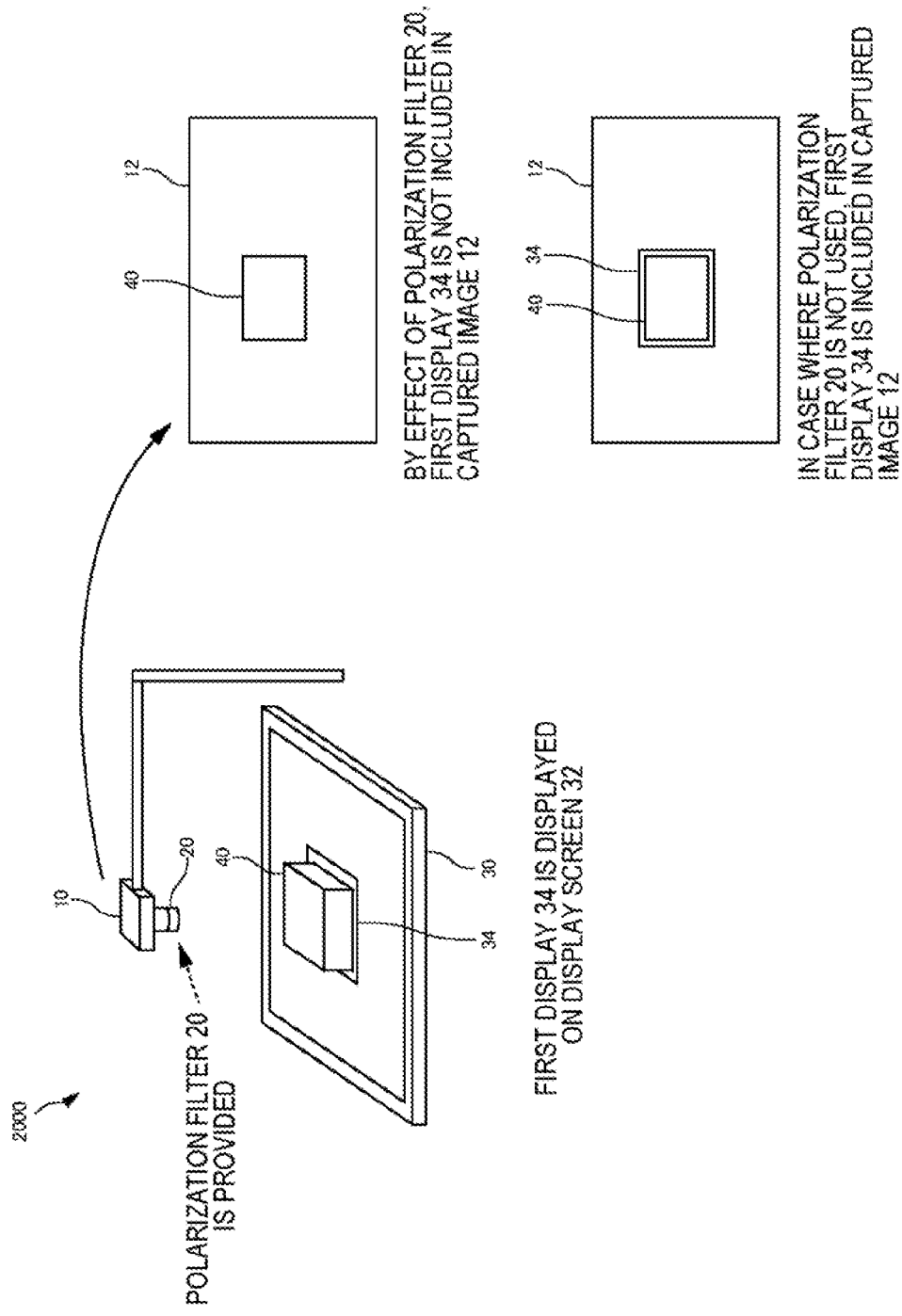
FIG. 1 is a diagram illustrating an information processing system according to an example embodiment 1.

Hereinafter, example embodiments of the present invention will be described with reference to the drawings. In all the drawings, the same components are denoted by the same reference numerals, and description thereof will not be repeated as appropriate. In addition, in each block diagram, each block represents a functional unit rather than a hardware unit unless otherwise specified.

Example Embodiment 1

FIG. 1 is a diagram illustrating an information processing system 2000 according to an example embodiment 1. Note that FIG. 1 is a diagram for easily understanding an operation of the information processing system 2000 and does not limit the operation of the information processing system 2000.

The information processing system 2000 performs image analysis on a captured image 12 generated by a camera 10. For example, the information processing system 2000 performs processing of registering a product as an object to be checked out when a customer purchases the product. In this case, the product is captured by the camera 10. The information processing system 2000 recognizes the product by performing image analysis on the captured image 12 obtained by capturing an image of the product. The product is recognized, and thus, for example, a price or a name of the product is identified. Hereinafter, an outline of the information processing system 2000 will be described.

The camera 10 has an image area in which a display screen 32 is included. The camera generates the captured image 12 by capturing an image of an object 40 placed on the display screen 32. The information processing system 2000 analyzes the captured image 12 and displays a display (hereinafter, referred to as a first display 34) based on the analysis result, on the display screen 32. Even after the first display 34 is displayed on the display screen 32, the camera 10 further generates a captured image 12 by capturing an image.

Here, the information processing system 2000 includes a first polarization filter 20. The first polarization filter 20 is located between the camera 10 and the display screen 32 when a lens of the camera 10 faces the display screen 32. In other words, the first polarization filter 20 is provided such that light incident on the camera 10 from the outside passes through the first polarization filter 20 and then enters on the camera 10. For example, the first polarization filter is attached to a lens portion of the camera 10.

Advantageous Effect

On the other hand, in a case where the first polarization filter 20 is not provided, the captured image 12, which is generated after the first display 34 is displayed, includes therein not only the object 40 but also the first display 34 so as to be clearly visible. Thus, when an information processing apparatus 200 analyzes the captured image 12, the first display 34, which is an image displayed on a display device 30, may be wrongly handled as a real object. For this reason, an error is likely to occur in image analysis of the information processing apparatus 200 (that is, accuracy in image processing is decreased). Further, when performing image analysis such that the first display 34 and the object included in the captured image 12 can be distinguished from each other, there is also a problem in that it is necessary to employ an image analysis algorithm for performing complicated processing, that a time required for image analysis becomes long, or that computer resources required for image analysis increase.

In this respect, in the information processing system 2000, the first polarization filter 20 attenuates light representing information displayed on the display screen 32, among light directed toward the lens of the camera 10. More specifically, as will be described later, light representing the first display 34 is polarized light, and the polarization filter 20 is provided so as to pass light having an oscillation direction different from an oscillation direction of the polarized light. With this configuration, the light representing the first display 34 does not pass through the polarization filter 20, or intensity of the light representing the first display 34 is greatly attenuated even when the light passes through the polarization filter 20.

On the other hand, light reflected by the object 40 and directed toward the camera 10 is natural light or illumination light, and is not polarized light. Thus, after the light passes through the polarization filter 20, the intensity of the light reflected by the object 40 and directed toward the camera 10 is sufficiently greater than the intensity of the light representing the first display 34. Therefore, while the object 40 is included in the captured image 12 with high brightness, the first display 34 is not included in the captured image 12 or has low brightness even when being included in the captured image 12. Accordingly, even in a state where the first display 34 is displayed on the display screen 32, accuracy of the image analysis by the information processing apparatus 200 can be improved. For example, even in a case where the first display 34 is included in the captured image 12, by performing preprocessing such as filtering processing based on a brightness level, the object 40 can be recognized with the first display 34 being removed from the captured image 12.

Hereinafter, the present example embodiment will be described in more detail.

<Example of Functional Configuration>

Figure 2:
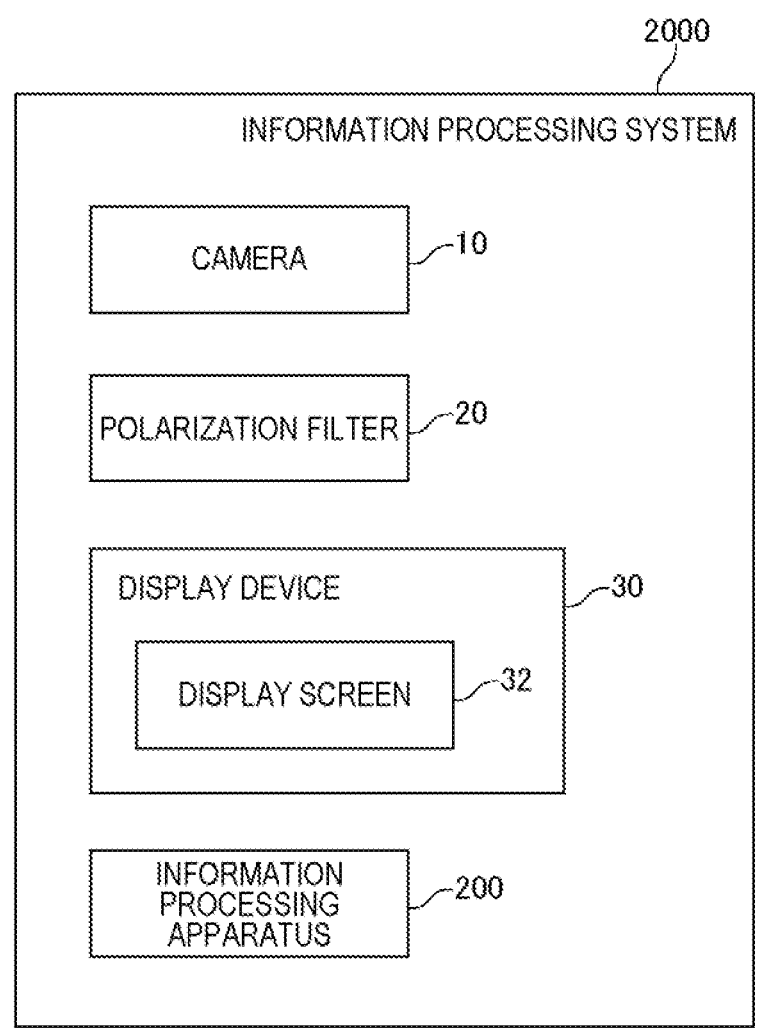
FIG. 2 is a block diagram illustrating a functional configuration of the information processing system.

FIG. 2 is a block diagram illustrating a functional configuration of the information processing system 2000. The information processing system 2000 includes a camera 10, a first polarization filter 20, a display device 30, and an information processing apparatus 200. The display device 30 includes a display screen 32. An object 40 is placed on the display screen 32. The camera 10 generates a captured image 12 by capturing an image of the object 40 placed on the display screen 32. The information processing apparatus 200 analyzes the captured image 12 and displays a first display 34 based on the analysis result, on the display screen 32. The first polarization filter 20 is located between the camera 10 and the display screen 32 when a lens of the camera 10 faces the display screen 32.

<Example of Hardware Configuration of Information Processing System 2000>

<<Information Processing Apparatus 200>>

Each functional component of the information processing apparatus 200 may be constituted by hardware (for example, a hard-wired electronic circuit or the like) that implements each functional component, or may be constituted by a combination of hardware and software (for example, a combination of an electronic circuit and a program for controlling the electronic circuit). Hereinafter, a case where each functional component of the information processing apparatus 200 is constituted by a combination of hardware and software will be further described.

Figure 3:
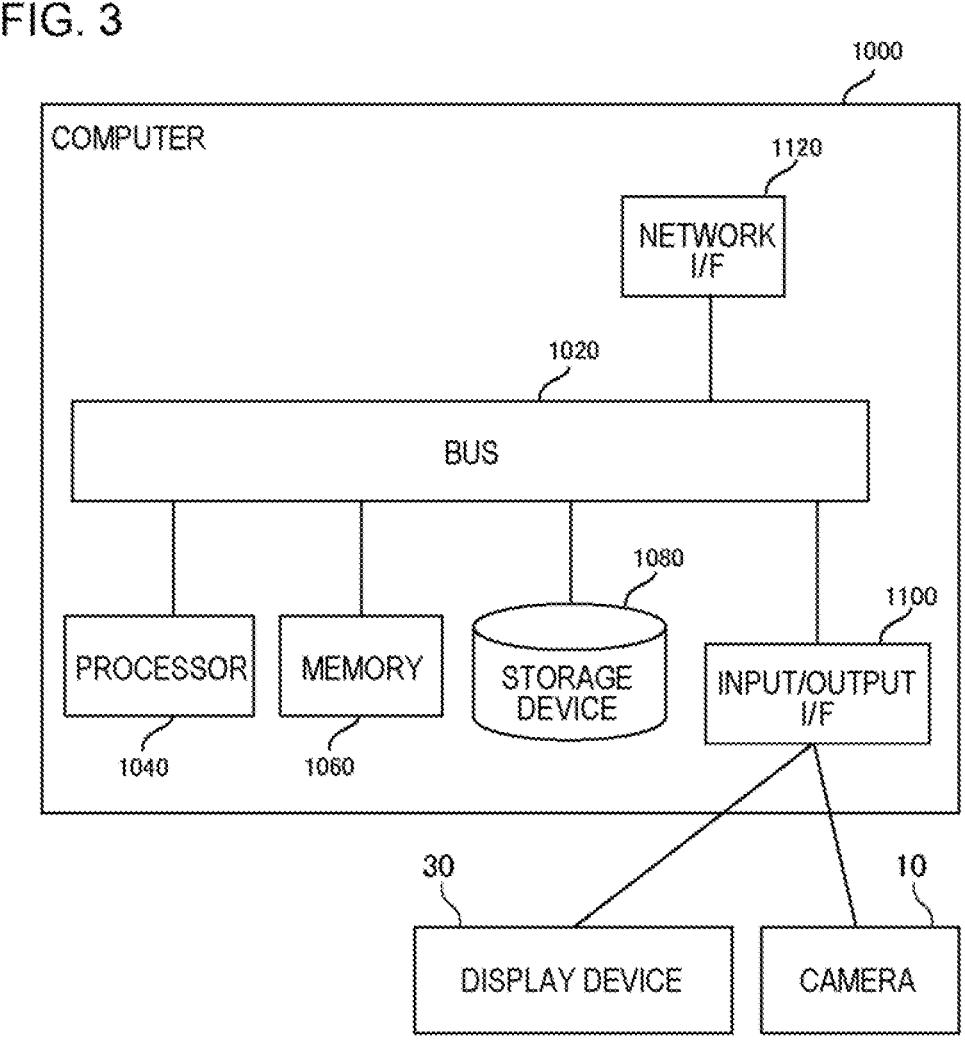
FIG. 3 is a diagram illustrating a computer for realizing an information processing apparatus.

FIG. 3 is a diagram illustrating a computer 1000 for realizing the information processing apparatus 200. The computer 1000 is a cash register such as a point of sales (POS) terminal. Here, the computer 1000 is not limited to a cash register. For example, the computer 1000 is a personal computer (PC), a server machine, a tablet terminal, a smartphone, or the like. The computer 1000 may be a dedicated computer designed to realize the information processing apparatus 200, or a general-purpose computer.

The computer 1000 includes a bus 1020, a processor 1040, a memory 1060, a storage device 1080, an input/output interface 1100, and a network interface 1120. The bus 1020 is a data transmission path through which the processor 1040, the memory 1060, the storage device 1080, the input/output interface 1100, and the network interface 1120 transmit and receive data to and from each other. The processor 1040 is an arithmetic processing unit such as a central processing unit (CPU) or a graphics processing unit (GPU). The memory 1060 is a main storage constituted by a random access memory (RAM) or the like. The storage device 1080 is an auxiliary storage constituted by a hard disk, a solid state drive (SSD), a memory card, a read only memory (ROM), or the like.

The input/output interface 1100 is an interface for connecting the computer 1000 and an input/output device. In FIG. 3, the camera 10 and the display device 30 are connected to the input/output interface 1100. The connection between the camera 10 or the display device 30 and the computer 1000 may be a wired connection or a wireless connection. Further, the camera 10 and the display device 30 may be connected to the computer 1000 through a communication network.

The network interface 1120 is an interface for connection to a communication network. The network interface 1120 may be an interface for connection to a communication network through wireless, or may be an interface for connection to a communication network through a wired line.

The storage device 1080 stores a program module that implements each function of the information processing apparatus 200. The processor 1040 implements each function corresponding to the program module by reading the program module into the memory 1060 and executing the program module.

<<Display Device 30>>

The display device 30 is one of various display devices having a function of displaying image data transmitted from the computer 1000 on a display screen. For example, the display device 30 is a liquid crystal display or an organic electro-luminescence (EL) display.

The display device 30 is provided such that an object can be placed on the display screen 32. For example, the display device 30 is provided such that the display screen 32 faces upward in a substantially vertical direction.

The display device 30 and the information processing apparatus 200 are connected to each other such that communication can be performed therebetween. For example, the display device 30 is provided separately from the information processing apparatus 200. In other words, in this case, a housing of the display device 30 and a housing of the information processing apparatus 200 are different from each other. The display device 30 and the information processing apparatus 200 may be integrally provided.

<<Camera 10>>

The camera 10 is any camera that can capture an image and generate image data (captured image 12) representing the captured result. The camera 10 may be a video camera that generates a moving image or a still camera that generates a still image.

The camera 10 is provided such that a display screen 32 is included in an image area of the camera 10. For example, the camera 10 is provided above the display screen 32 such that the lens of the camera 10 faces downward.

<<First Polarization Filter 20>>

The first polarization filter 20 is a polarizer that allows, among incident light, light (polarized light) which oscillates in a specific direction to pass through. The first polarization filter 20 is realized, for example, as an attachment that can be attached to the lens portion of the camera 10.

Figure 4:
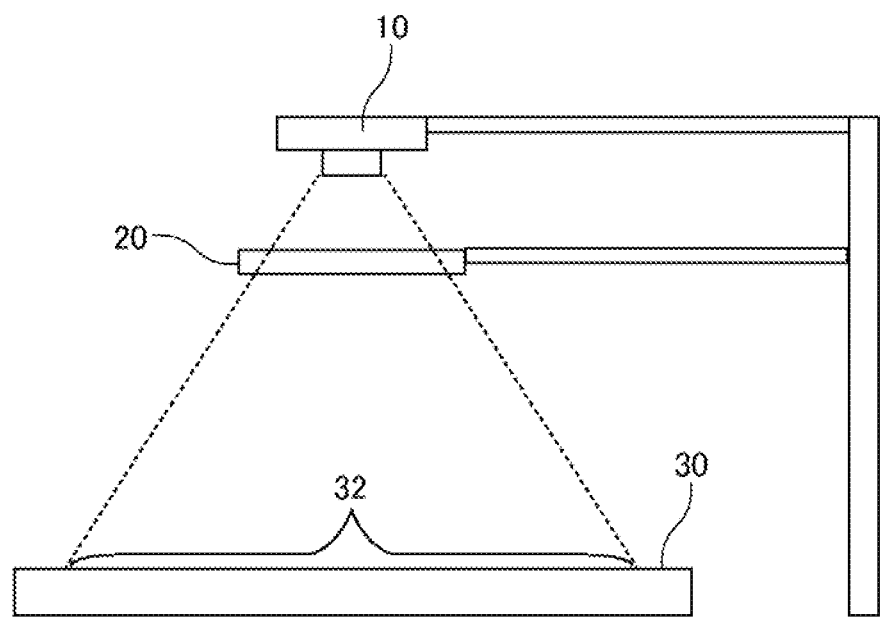
FIG. 4 is a diagram illustrating a first polarization filter provided at a position apart from a lens of a camera.

Here, the first polarization filter 20 does not necessarily have to be realized in a form that can be attached to the lens portion of the camera 10, and may be provided at a position apart from the lens of the camera 10. FIG. 4 is a diagram illustrating the first polarization filter 20 provided at a position apart from the lens of the camera 10. In FIG. 4, the camera 10 is provided such that the lens of the camera 10 faces the display screen 32. The first polarization filter 20 is provided between the lens of the camera 10 and the display screen 32. In this case, it is preferable to determine a position of the first polarization filter 20 such that a straight line connecting each position of an area where the object 40 is placed on the display screen 32 (for example, the entire area of the display screen 32) and the lens of the camera 10 passes through the first polarization filter 20.

Figure 5:
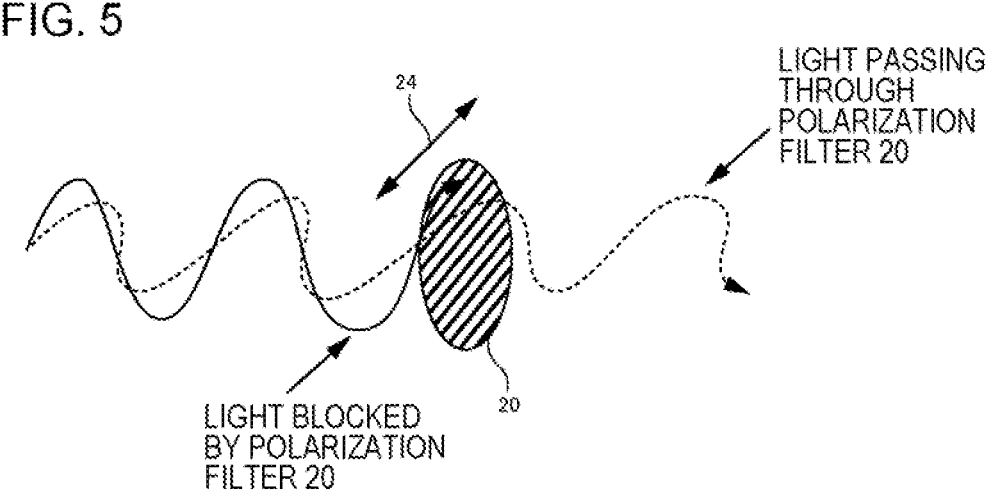
FIG. 5 is a diagram conceptually illustrating attenuation of light by the first polarization filter.

The display screen 32 emits light representing the first display 34. The first polarization filter 20 is provided so as to attenuate and pass the light. FIG. 5 is a diagram conceptually illustrating attenuation of the light by the first polarization filter 20. In FIG. 5, the first polarization filter 20 passes the light that oscillates in a direction indicated by a reference numeral 24. Hereinafter, the oscillation direction of the light passing through the first polarization filter 20 in this way is referred to as a passing direction 24. As compared with light before passing through the first polarization filter 20, in light after passing through the first polarization filter 20, intensity of light oscillating in a direction other than the passing direction 24 is decreased.

<Method of Attenuating Light Representing First Display 34>

In a case where the oscillation direction of the light representing the first display 34 does not match with the passing direction 24, the light representing the first display 34 is attenuated by passing through the first polarization filter 20. Therefore, the oscillation direction of the light representing the first display 34 is set not to match with the passing direction 24.

Here, the display device may emit polarized light, or may emit non-polarized light. A liquid crystal display is an example of a display device that emits polarized light. On the other hand, an organic EL display is an example of a display device that emits non-polarized light.

Hereinafter, a method for preventing the oscillation direction of the light representing the first display 34 and the passing direction 24 from matching with each other will be described by dividing a case where the light emitted from the display device 30 is polarized light and a case where the light emitted from the display device 30 is non-polarized light.

<<Case where Light Emitted from Display Device 30 is Polarized Light>>

In a case where polarized light is emitted from the display device 30, the first polarization filter 20 is provided such that the passing direction 24 does not match with the oscillation direction of the polarized light emitted from the display device 30. With this configuration, the oscillation direction of the light representing the first display 34 does not match with the passing direction 24.

Figure 6:
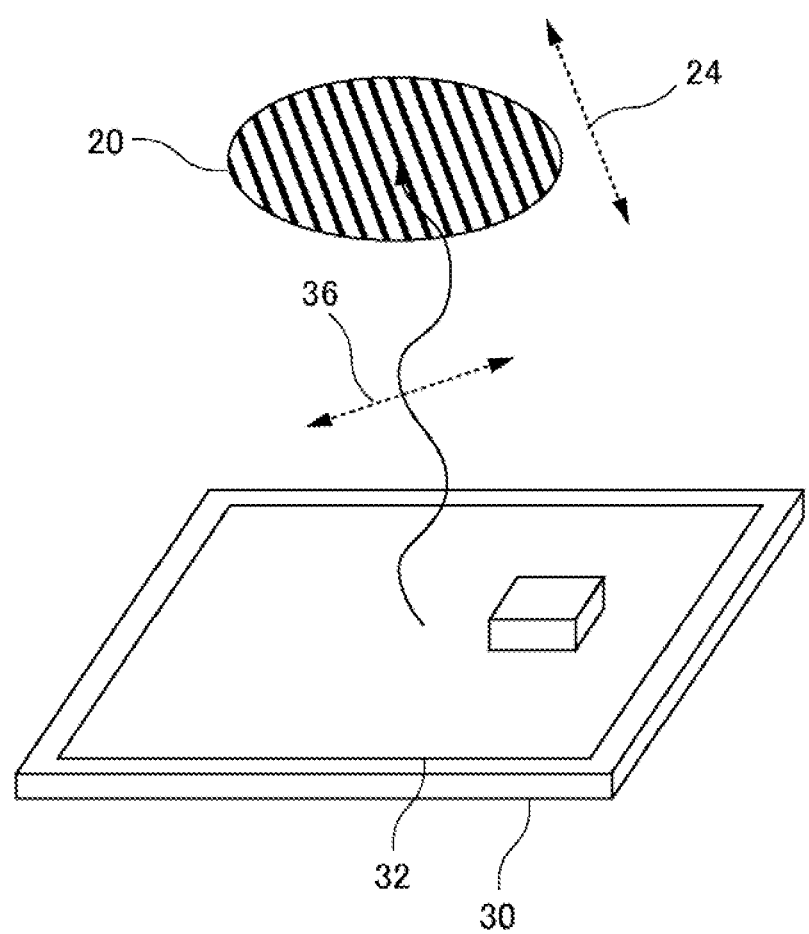
FIG. 6 is a diagram illustrating a relationship between an oscillation direction of polarized light emitted from a display device and a first direction.

Preferably, the first polarization filter 20 is provided such that the oscillation direction of the polarized light emitted from the display device 30 and the passing direction 24 are substantially orthogonal to each other. FIG. 6 is a diagram illustrating a relationship between the oscillation direction of the polarized light emitted from the display device 30 and the passing direction 24. In FIG. 6, the first polarization filter 20 is provided such that the passing direction 24 is substantially orthogonal to the oscillation direction 36 of the polarized light emitted from the display device 30.

The passing direction 24 and the oscillation direction of the light emitted from the display device 30 do not necessarily need to be substantially orthogonal to each other. Here, as an angle formed by the passing direction 24 and the oscillation direction of the light emitted from the display device 30 is closer to 90 degrees, a degree to which the light representing the first display 34 is attenuated by the first polarization filter 20 is greater. Therefore, it is preferable to increase the angle formed by the passing direction 24 and the oscillation direction of the light emitted from the display device 30 such that brightness of pixels of the first display 34 included in the captured image 12 has a level in which the image analysis of the captured image 12 by the information processing apparatus 200 is not hindered. Note that a method of adjusting the direction of the first polarization filter 20 will be described later.

<<Case where Light Emitted from Display Device 30 is Non-Polarized Light>>

In a case where non-polarized light is emitted from the display device 30, the light emitted from the display device 30 is a combination of lights having a plurality of oscillation directions. In such a case, the light representing the first display 34 has a plurality of oscillation direction components. Thus, in a case where the light emitted from the display device 30 only passes through the first polarization filter 20, the light representing the first display 34 may not be sufficiently attenuated.

Therefore, in this case, it is preferable to add another polarization filter to the information processing system 2000. Specifically, a second polarization filter 50 is provided between the display device 30 and the object 40. Similar to the first polarization filter 20, the second polarization filter 50 is also a polarizer that allows light which oscillates in a specific direction to pass through. For example, the second polarization filter 50 is provided on the display screen 32.

FIG. 7 is a diagram illustrating a situation in which the second polarization filter 50 is provided on the display device 30. In a case where the second polarization filter 50 is provided in this way, the light emitted from the display device 30 is polarized by the second polarization filter 50 and then reaches the first polarization filter 20. On the other hand, reflected light reflected by the object 40 and directed toward the camera 10 reaches the first polarization filter without passing through the second polarization filter 50. In FIG. 7, an oscillation direction of the light passing through the second polarization filter 50 is the passing direction 54.

By providing the second polarization filter 50 in this way, the display device 30 that emits non-polarized light can be handled in the same manner as the display device 30 that emits polarized light. That is, it can be said that the passing direction 54 as the oscillation direction of the polarized light emitted from the second polarization filter 50 corresponds to the oscillation direction of the light emitted by the display device 30 emitting the polarized light. Therefore, by providing the first polarization filter 20 and the second polarization filter 50 such that the passing direction 54 and the passing direction 24 (the oscillation direction of the light passing through the first polarization filter 20) do not match with each other, the light representing the first display 34 can be attenuated. Preferably, the first polarization filter 20 and the second polarization filter 50 are provided such that the passing direction 24 and the passing direction 54 are substantially orthogonal to each other.

There are various methods of providing the second polarization filter 50. For example, the second polarization filter 50 is configured as a sheet that can be attached to the display screen 32. In this case, the second polarization filter 50 is attached to the display screen 32. Alternatively, for example, the second polarization filter 50 may be placed on the display screen 32.

Note that the second polarization filter 50 may be provided inside the display device 30. Here, it can be said that the display device 30 in which the second polarization filter 50 is provided inside is a "display device that emits polarized light".

<Processing Performed by Information Processing Apparatus 200>

The information processing apparatus 200 analyzes the captured image 12 and displays the first display 34 based on the analysis result, on the display screen 32. Hereinafter, specific examples of processing performed by the information processing apparatus 200 will be described.

<<Object Detection>>

For example, the information processing apparatus 200 performs processing of detecting an object 40 included in the captured image 12. Here, for the processing of detecting the object included in the captured image, an existing technique may be used.

Figure 8:
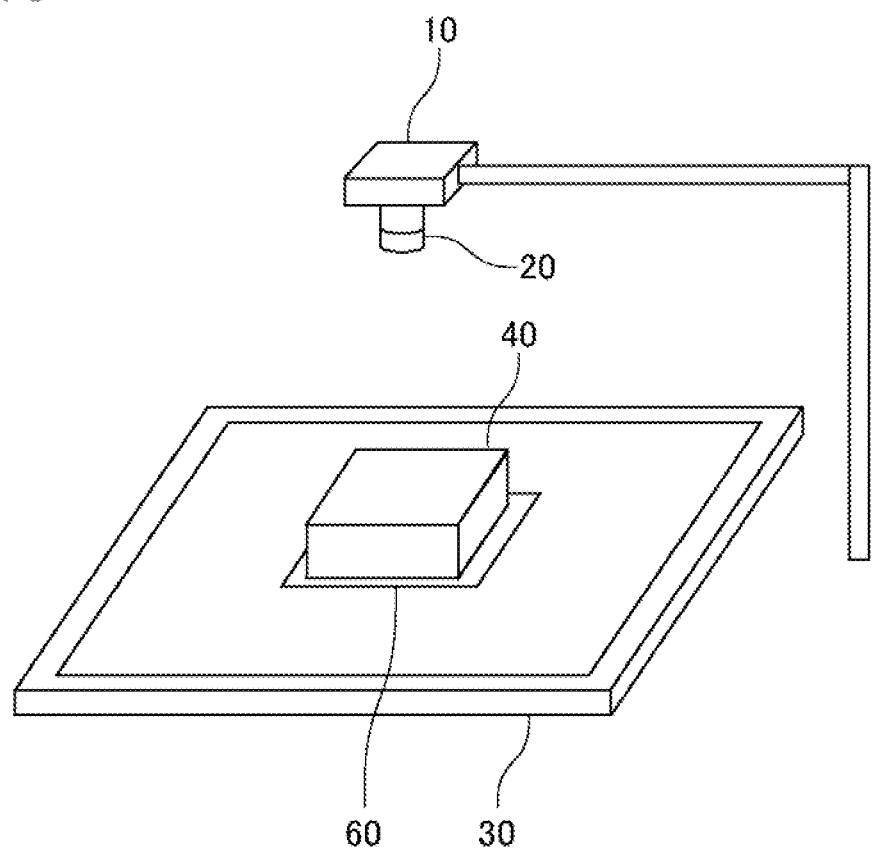
FIG. 8 is a diagram illustrating a scene in which a display indicating a position of an object is displayed on a display screen in response to detection of the object from a captured image.

The information processing apparatus 200 displays information on the detected object 40, on the display screen 32. For example, the information processing apparatus 200 displays information indicating a position of the detected object 40, on the display screen 32. FIG. 8 is a diagram illustrating a scene in which a display indicating a position of the object 40 is displayed on the display screen 32 in response to detection of the object 40 from the captured image 12. In FIG. 8, a mark 60 is a display indicating a position at which the object 40 is detected. The mark 60 is a border representing an outer circumference of the object 40 included in the captured image 12 (an outer circumference of the object 40 when the display screen 32 is seen in a plan view).

Here, the information processing apparatus 200 attempts to detect an object from each captured image 12 generated by the camera 10 such that the object can be detected when the object is placed on the display device 30. Thus, the information processing apparatus 200 also attempts to detect the object in the captured image 12 generated after the object 40 is placed on the display device 30. In a case where the mark 60 is included in the captured image 12 so as to be clearly visible, the information processing apparatus 200 may erroneously detect the mark 60 as an object. In this case, for example, processing of "another mark 60 is further displayed around the mark 60" is repeated, and as a result, the operation of the information processing apparatus 200 becomes an unintended operation.

In this respect, according to the information processing system 2000, the light representing the mark 60 is attenuated by the first polarization filter 20, and thus, the mark 60 is not included in the captured image 12 or brightness of pixels of the mark 60 included in the captured image 12 becomes sufficiently lower than brightness of pixels representing the object 40. Therefore, the information processing apparatus 200 does not detect the mark 60 as an object.

Thereafter, it is assumed that a new object 40 is placed on the display device 30. The intensity of the light representing the object 40 is sufficiently large even after the light passes through the polarization filter 20. Thus, the new object 40 is included in the captured image 12 so as to be clearly visible. Therefore, the new object 40 can be detected by the object detection processing.

As described above, according to the information processing system 2000, even in a case where the object 40 is added after the mark 60 is displayed on the display screen 32, the object can be correctly detected without erroneously detecting the mark 60 as an object. Therefore, accuracy of the object detection can be improved by the effect of the first polarization filter 20.

<<Object Recognition>>

In addition, for example, the information processing apparatus 200 performs object recognition on the captured image 12. The object recognition is processing of detecting an object included in an image and identifying the detected object.

For example, as described above, the information processing apparatus 200 recognizes a product placed on the display screen 32 and performs processing of registering the recognized product as an object to be checked out. Here, for the processing of recognizing a product included in the captured image by image analysis and registering the recognized product as an object to be checked out, an existing technique may be used.

By recognizing, as a product, the object 40 included in the captured image 12, the information processing apparatus 200 acquires various information on the object 40 such as a price or a product name of the object 40. Therefore, the information processing apparatus 200 displays, on the display screen 32, the acquired information on the object 40 (that is, a price, a product name, or the like of the object 40).

Further, preferably, the information processing apparatus 200 displays the mark 60 described above in addition to a product display 70. In this case, a situation of "the object 40 is detected, but it is not possible to recognize what kind of product the object 40 is" can be recognized. This is because the mark 60 is displayed while the product display 70 is not displayed in such a situation.

Figure 9:
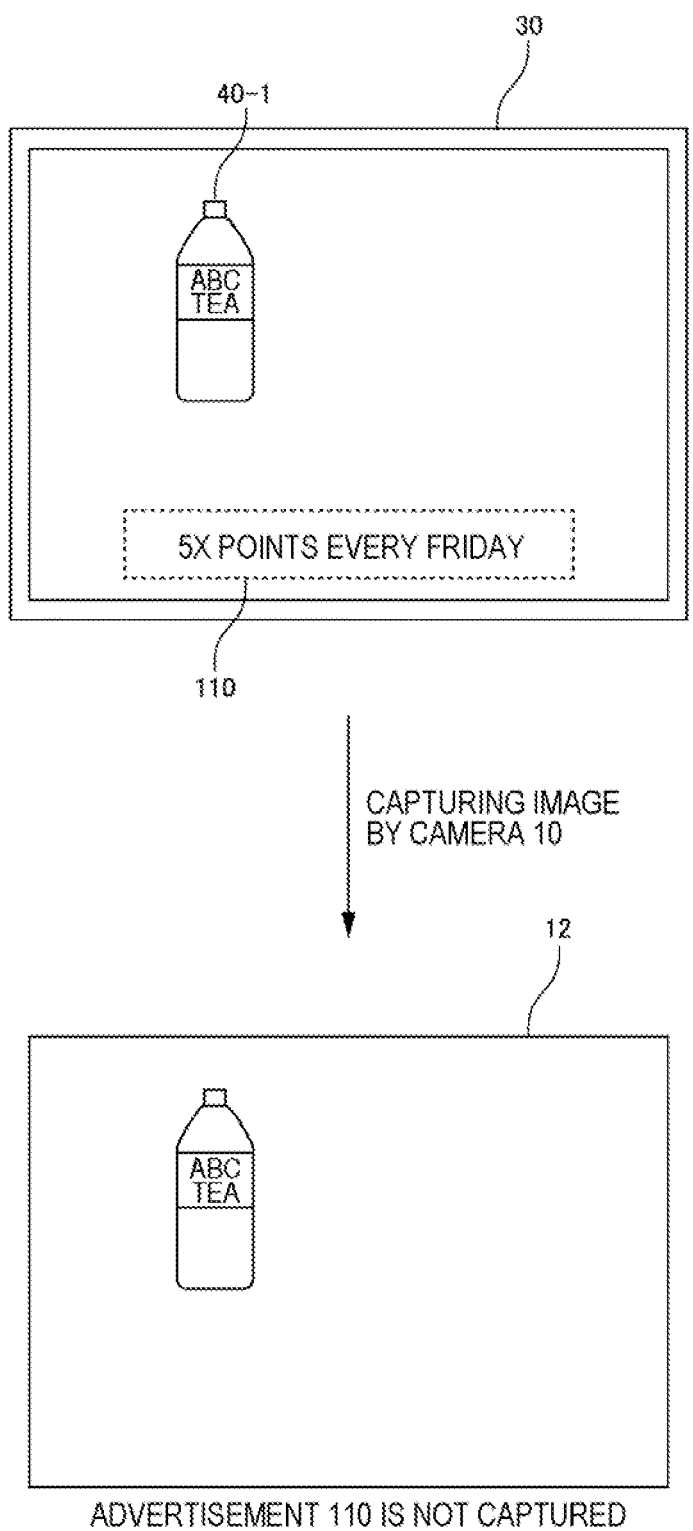
FIG. 9 is a diagram illustrating a scene in which product information is displayed on the display screen.
Figure 10:
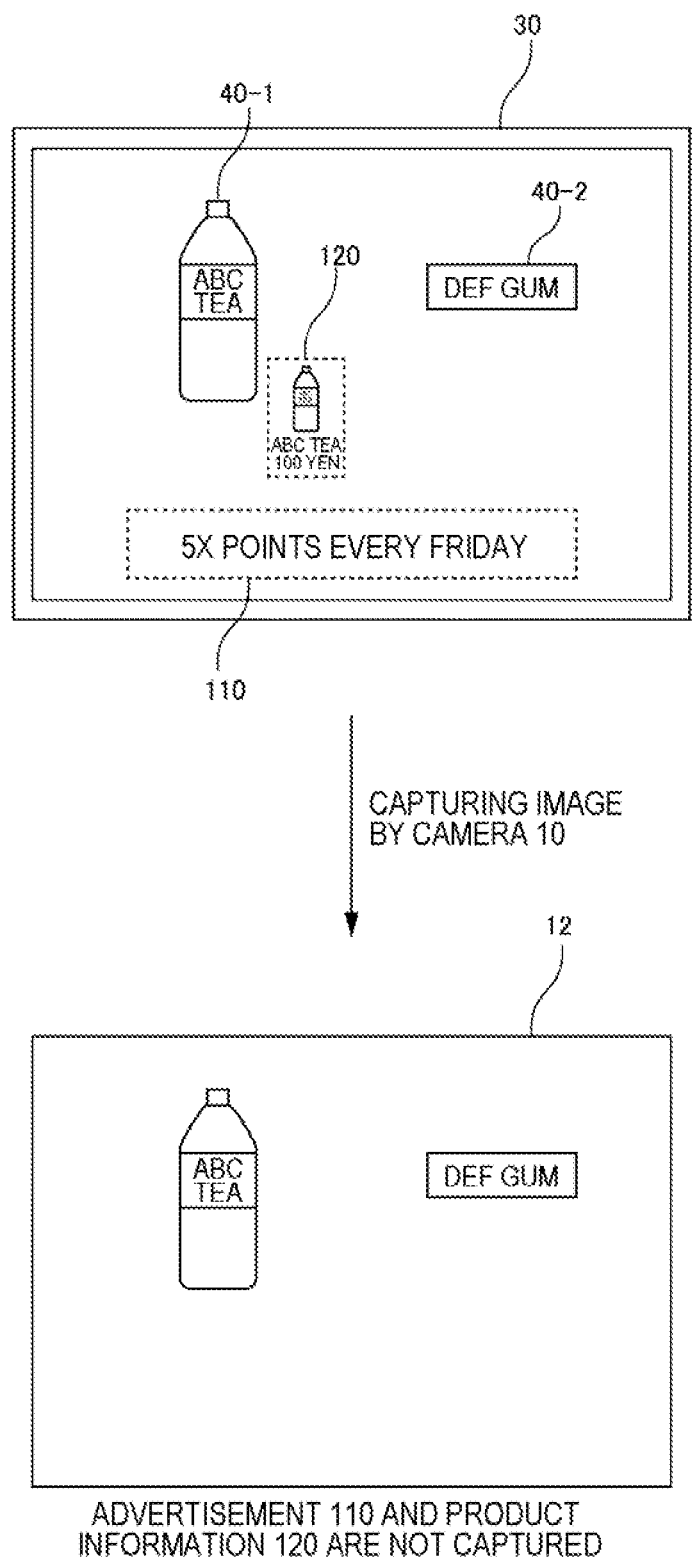
FIG. 10 is a diagram illustrating a scene in which product information is displayed on the display screen.

FIG. 9 and FIG. 10 are diagrams illustrating a case where object recognition is performed. In FIG. 9, an object 40-1 is placed on the display screen 32. Further, an advertisement 110 is displayed on the display screen 32. The information processing system 2000 acquires a captured image 12-1 by capturing an image of the display screen 32 in this situation by the camera 10.

Here, displaying an advertisement on the display screen 32 is useful in terms of effect of increasing a purchasing desire of a customer. On the other hand, in a case where the advertisement displayed on the display screen 32 is included in the captured image 12, product recognition may be hindered.

In this regard, by the effect of the first polarization filter 20, an advertisement 110 is not included in the captured image 12-1. Therefore, the information processing system 2000 can accurately recognize the object 40-1 without erroneously detecting the advertisement 110 as an object.

FIG. 10 illustrates a scene after product recognition of the object 40-1 is completed. The information processing system 2000 recognizes that the object 40-1 is a product called "ABC tea", by using the captured image 12-1. As a result, the information processing system 2000 displays product information 120, which is information on the ABC tea, on the display screen 32. The product information 120 includes a product image, a product name, and a price of the recognized product. These pieces of information are displayed on the display screen 32, and thus a user of the information processing system 2000 can recognize that the object 40-1 is correctly recognized by the information processing system 2000.

In FIG. 10, a new object 40-2 is further placed on the display screen 32. The information processing system 2000 acquires a captured image 12-1 by capturing an image of the display screen 32 in this situation by the camera 10.

Here, as described above, the product information is useful in that a user can recognize the product recognition. On the other hand, in a case where the product information is included in the captured image 12 which is subsequently generated, product recognition may be hindered.

In this regard, by the effect of the first polarization filter 20, an advertisement 110 and product information 120 are not included in the captured image 12-2. Therefore, the information processing system 2000 can recognize the object 40-2 without erroneously detecting the advertisement 110 and the product information 120 as an object.

From the above, by the effect of the first polarization filter 20, in the system that captures an image of a product placed on the display screen 32 and recognizes the product, information on the recognized product or an advertisement can be displayed on the display screen 32. Therefore, it is possible to realize accurate product recognition while increasing a purchasing desire of a customer and improving convenience of the information processing system 2000.

<Method of Confirming Proper Direction of First Polarization Filter 20>

Preferably, the information processing system 2000 is operated after it is confirmed that a direction of the first polarization filter 20 is proper (that is, the passing direction 24 of the first polarization filter 20 and the oscillation direction of the light representing the first display 34 do not match with each other). Hereinafter, a method of determining whether or not the direction of the polarization filter 20 is proper will be described.

<<Determination by User>>

For example, the user of the information processing system 2000 confirms the direction of the polarization filter 20 while observing the captured image 12. First, a second display is displayed on the display screen 32, and the camera 10 repeatedly generates a captured image 12. The second display may be any image. The user adjusts the direction of the first polarization filter 20 while observing the captured image 12 such that the second display is not included in the captured image 12.

The display device that displays the captured image 12 may be the display device 30 or may be another display device. In the former case, preferably, only a partial area of the display screen 32 is included in the image area of the camera 10, and the captured image 12 is displayed outside the area.

The second display and the captured image 12 may be displayed at any timing. For example, the information processing apparatus 200 has two modes of an operation mode and a test mode, and these two modes can be switched by a user operation. The information processing apparatus 200 displays the second display and the captured image 12 according to selection of the test mode.

<<Determination by Information Processing Apparatus 200>>

The information processing apparatus 200 may have a function of determining whether or not the direction of the first polarization filter 20 is proper. For example, in a state where the object 40 is not placed on the display screen 32 and the second display is displayed on the display screen 32, the camera 10 repeatedly generates the captured image 12. The information processing apparatus 200 performs the above-described object detection on the captured image 12 generated in this state.

Here, in a case where an object is detected by the information processing apparatus 200, this means that the second display is erroneously detected as an object. Therefore, the information processing apparatus 200 determines whether or not an object is detected by the object detection, and determines that the direction of the first polarization filter 20 is not proper when an object is detected. On the other hand, the information processing apparatus 200 determines that the direction of the first polarization filter 20 is proper when an object is not detected by the object detection.

The information processing apparatus 200 displays, on the display device, the determination result as to whether or not the direction of the first polarization filter 20 is proper. The determination result may be displayed on the display device 30, or may be displayed on a display device other than the display device 30. In the former case, preferably, only a partial area of the display screen 32 is included in the image area of the camera 10, and the determination result is displayed outside the area.

FIG. 11 is a diagram illustrating a scene in which a result of determination as to whether or not the direction of the first polarization filter 20 is proper is displayed on the display screen 32. In FIG. 11, the second display is indicated by a reference numeral 80. In the example in an upper portion of FIG. 11, the second display 80 is included in the captured image 12 so as to be clearly visible. Thus, the second display 80 is detected as an object. Therefore, the information processing apparatus 200 displays, on the display screen 32, a notification 90 indicating that the direction of the first polarization filter 20 is not proper.

On the other hand, in a lower portion of FIG. 11, the second display 80 is not included in the captured image 12. Thus, the second display 80 is not detected as an object. Therefore, the information processing apparatus 200 displays, on the display screen 32, a notification 100 indicating that the direction of the first polarization filter 20 is proper.

When the notification 90 is displayed, the user changes the direction of the first polarization filter 20 until the notification 100 is displayed. Thereby, the direction of the first polarization filter 20 can be easily adjusted.

The second display 80 may be displayed on the display screen 32 at any timing. For example, as described above, the information processing apparatus 200 has two modes of an operation mode and a test mode. The information processing apparatus 200 displays the second display 80 according to selection of the test mode by the user.

As described above, the example embodiment of the present invention has been described with reference to the drawings, but the example embodiment is merely an example of the present invention. Various configurations other than the above-described configuration may be adopted.

The invention claimed is:

1. An information processing system comprising:
    a display device having a display screen on which an object is placed;
    a camera having an image area in which the display screen is included;
    an information processing apparatus that displays, on the display screen, a first display based on a captured image generated by the camera; and
    a first polarization filter,
    wherein the first polarization filter is located between a lens of the camera and the display screen when the lens of the camera faces the display screen, wherein
    the information processing apparatus
        analyzes the captured image to detect an object included in the captured image,
        displays, in response to detection of the object from the captured image, a display indicating a position of the detected object as the first display on the display screen,
        displays, on the display screen, a second display representing an object which is not placed on the display screen,
        analyzes the captured image including the second display displayed on the display screen to detect the object, and
        determines whether or not a direction of the first polarization filter is proper based on whether the object is detected or not in a result of the analyzing.

2. The information processing system according to claim 1,
    wherein the first display is represented by light which is polarized light oscillating in a first direction, and
    wherein the first polarization filter passes light oscillating in a second direction different from the first direction.

3. The information processing system according to claim 2,
    wherein the display device emits polarized light oscillating in the first direction.

4. The information processing system according to claim 2, further comprising:
    a second polarization filter that is provided above the display screen and passes light oscillating in the first direction,
    wherein the object is placed on the second polarization filter.

5. The information processing system according to claim 1,
    wherein the information processing apparatus detects a product placed on the display screen from the captured image, and displays, on the display screen, the first display related to the detected product.

* * * * *